(No Model.)
L. RUSSELL.
FUMIGATOR.
No. 435,860. Patented Sept. 2, 1890.
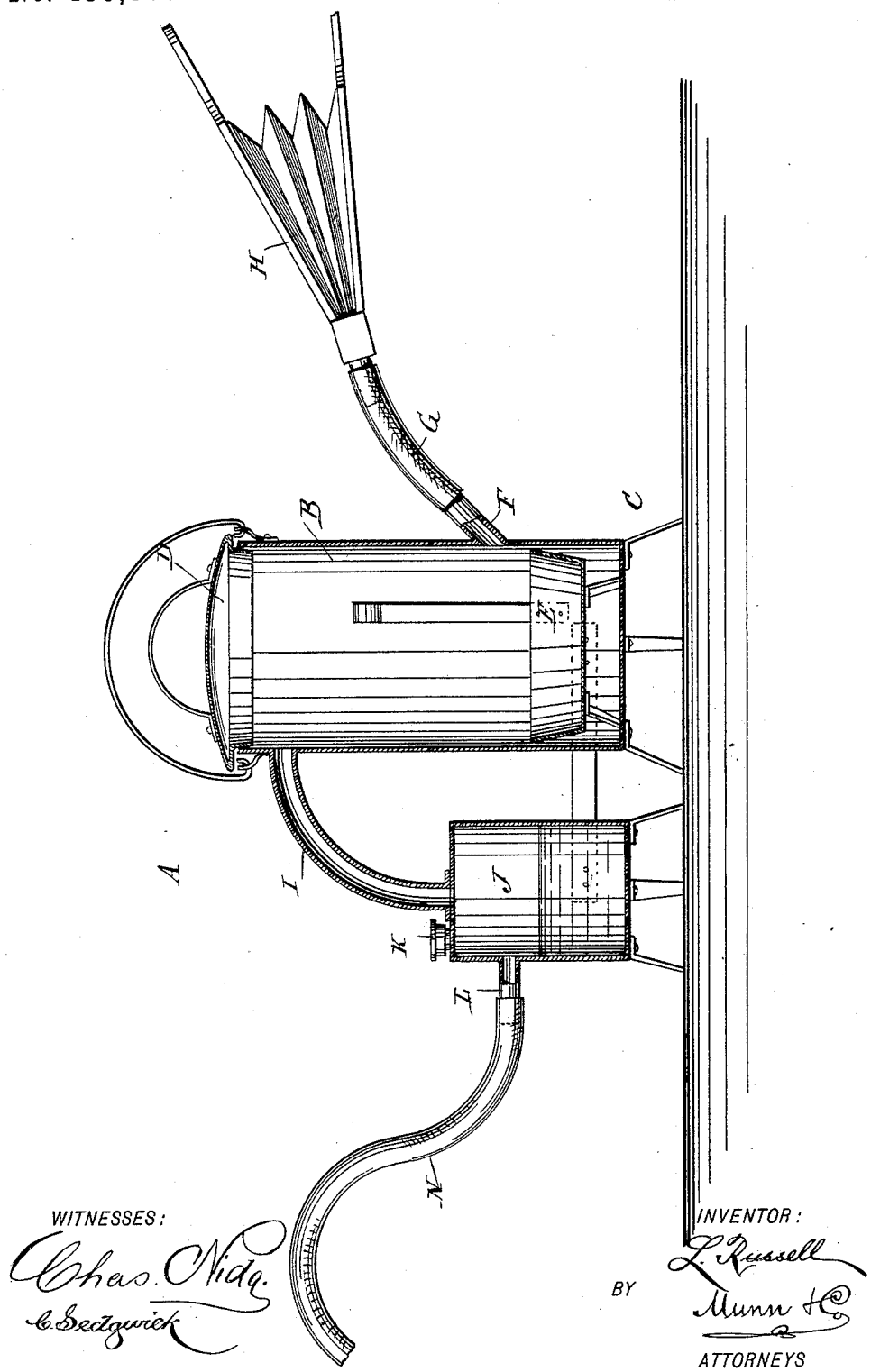
WITNESSES:
Chas. Nida.
C. Sedgwick
INVENTOR:
L. Russell
BY Munn & Co.
ATTORNEYS

UNITED STATES PATENT OFFICE.

LEE RUSSELL, OF LULING, TEXAS.

FUMIGATOR.

SPECIFICATION forming part of Letters Patent No. 435,860, dated September 2, 1890.

Application filed April 30, 1890. Serial No. 350,015. (No model.)

*To all whom it may concern:*

Be it known that I, LEE RUSSELL, of Luling, in the county of Caldwell and State of Texas, have invented a new and Improved Animal-Exterminator, of which the following is a full, clear, and exact description.

The object of the invention is to provide a new and improved animal-exterminator which is simple and durable in construction, readily applied, easily handled, and specially designed for exterminating animals burrowing in the ground or living in holes—such, for instance, as rats, gophers, skunks, &c.

The invention consists of certain parts and details and combinations of the same, as will be described hereinafter, and then pointed out in the claims.

Reference is to be had to the accompanying drawings, forming a part of this specification, in which the figure represents a sectional side elevation of the improvement.

The improved animal-exterminator A is provided with a vessel B of suitable size and material and mounted on legs C, so as to raise the vessel from the ground or floor near the hole or burrow of the animal to be exterminated. The vessel B is provided with a removable top or lid D, and in its bottom is arranged a fire-box E, preferably held on legs, as shown, and adapted to contain a fire caused by burning a suitable fuel held in said fire-box. Directly above the fire-box is arranged an inlet-pipe F, connected by a flexible tube G with the mouth of the bellows H, of any approved construction. From the upper part of the vessel B leads a pipe I, opening into the top of a small vessel J, mounted on legs and connected by suitable straps with the vessel B. The vessel J is adapted to receive a quantity of water filled into the vessel through a suitable capped pipe K. From the vessel J above the water-level extends a pipe L, connected with a flexible tube N, adapted to be placed into the opening or hollow supposed to lead to the animal's nest.

The operation is as follows: A fire is made in the fire-box E, and then the operator throws into the vessel B a quantity of sulphur, which falls on the burning fuel, after which he replaces the lid D and starts the bellows, so that the fumes in the vessel B are driven through the pipe I into the smaller vessel J, and from the latter pass through the pipe L and the pipe N into the opening leading to the animal's nest, so that the said animals are asphyxiated by the fumes. In case the tube N is applied to a hole formed in woodwork or other easily-inflammable material, the vessel J is filled with water, as indicated in the drawing, so that any sparks passing through the fumes out of the vessel B into the said vessel J are arrested in the water, and at the same time the fumes are somewhat cooled, thus preventing the building to which the tube is applied from taking fire. When the tube N is applied to the ground, the water in the vessel J is not needed.

It will be seen that the device is very simple and durable in construction, can be easily carried about, and the fumes readily driven into the holes or burrows for exterminating the animals.

Having thus described my invention, what I claim as new, and desire to secure by Letters Patent, is—

1. An animal-exterminator comprising the closed vessel B, mounted on legs C and provided with the removable cover D, the fire-box E, having legs resting upon the bottom of the vessel, the inlet F near the bottom and the outlet near the top, and the bellows H, connected to the inlet F, substantially as described.

2. The herein-described animal-exterminator, consisting of the vessel B, mounted on feet and provided with the cover D, the fire-box E, the inlet F, and the outlet I, the bellows H, connected to the inlet F, the water-vessel J, to the top of which the outlet I is connected, provided with the capped pipe K' and the outlet-pipe L, and the flexible pipe N, connected to the pipe L, as specified.

LEE RUSSELL.

Witnesses:
DAVID GREGG,
T. ALF. O'REILLY.